April 10, 1962   A. L. HUBBARD   3,028,718
COTTON HARVESTER WITH STOP MEANS ACTUATED
BY THE MOISTENING ASSEMBLY
Filed Feb. 29, 1960
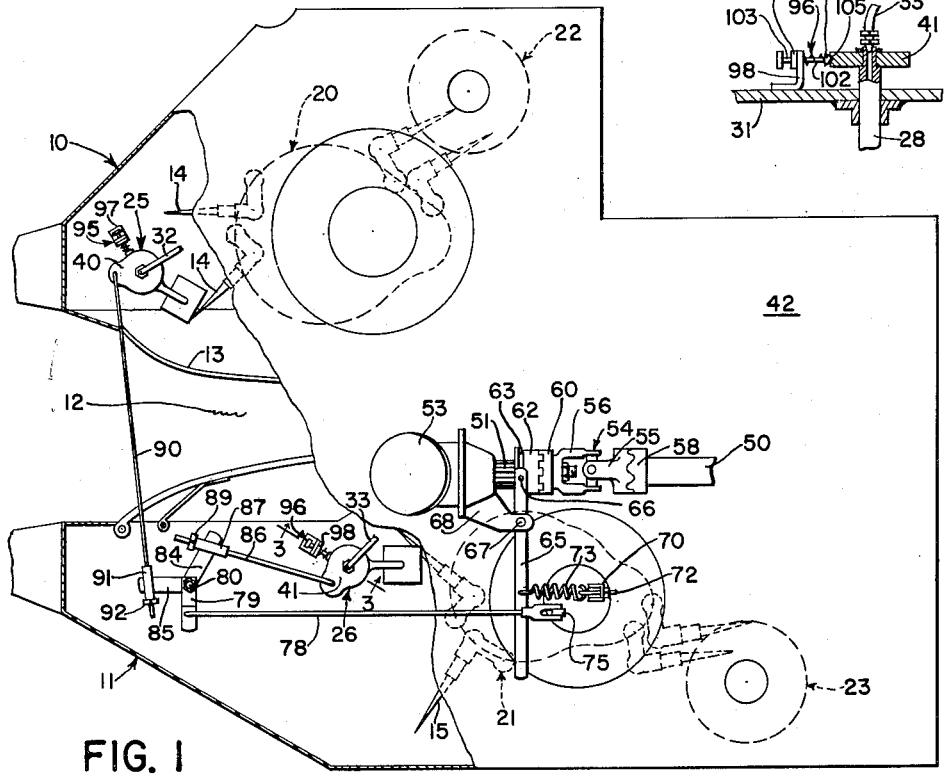
FIG. 3
FIG. 1
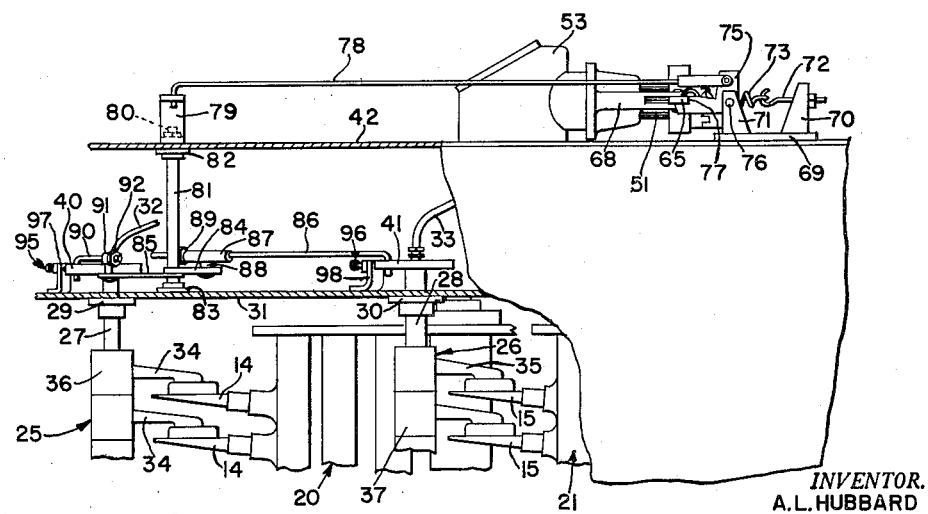
FIG. 2
INVENTOR.
A.L. HUBBARD
BY
ATTORNEYS United States Patent Office 3,028,718
Patented Apr. 10, 1962

3,028,718
COTTON HARVESTER WITH STOP MEANS ACTUATED BY THE MOISTENING ASSEMBLY
Arthur L. Hubbard, Des Moines, Iowa, assignor to Deere & Company, Moline, Ill., a corporation of Delaware
Filed Feb. 29, 1960, Ser. No. 11,793
12 Claims. (Cl. 56—41)

This invention relates to a cotton harvester and more particularly to an overload responsive mechanism which will automatically shut off the drive for the harvester in response to clogging or upon a relatively large foreign object being disposed in and about the harvesting mechanism.

In the conventional type of cotton harvester there is provided a pair of upright casings normally disposed on opposite sides of a row of plants with open sides in each of the casings facing the plants. Harvesting mechanism consisting of an upright drum with laterally extending and vertically spaced picking spindles or elements are positioned in each casing with the picking elements extending through the open sides of the casings to contact and pick the cotton from the row of plants. Within each casing there is provided doffing mechanism which removes the cotton from the picking elements or spindles and discharges the cotton into a suction type conveyor which moves the cotton to a receptacle.

It is not uncommon for clogging to occur between the process of doffing or removing the cotton from the spindles and the process of conveying the cotton into the receptacle. If clogging occurs, it will often occur following the doffing operation and within the casing below the entry or entrance into the conveyor duct. Generally, the clogging is due to a malfunction of the suction type conveying system and generally it consists of a pile-up of the cotton bolls within the picker housing.

It is also conventional in cotton harvesters to provide moistener mechanisms which are composed of a series of vertically spaced moistener arms which extend from a centrally located column or support and engages the picking spindles or elements following the doffing operation. Moisture is fed through the moistener arms and pads are provided on the arms which contact the spindles or picking element, either from above or below the elements. It should be recognized that since the arms extend adjacent to the picking spindles and also between the spindles, the vertical space between the arms is relatively small. Should clogging occur within the casing and is not detected, there will be a build up of cotton in front of the moistener arms which will effect an impediment or restriction to rotation of the picking drum. It is not uncommon in cotton harvesters that injury or damage may be done to either the picking spindles and the associated drum mechanism, or to the moistener arms and its associated moistener mechanism due to clogging of the unit. Also, it is rather obvious the damage which could be done should a foreign object such as a stone, metal strap, or board become embedded between the arms of the moistener mechanism or in front of the moistener mechanism.

It is therefore proposed and is the primary object of this invention to support the moistener mechanisms in the casings so as to permit pivoting of the entire moistener mechanisms about an upright axis. A spring loaded detent is provided for each moistener mechanism which prevents swivelling of the moistener mechanism unless abnormally large load is applied on the moistener arms, so as to overcome the effect of the detent.

It is also proposed to provide a clutch in the drive mechanism for the harvester which is connected to each of the moistener mechanisms so that the clutch is thrown-out in response to swivelling or pivoting of either moistener mechanism and the entire harvesting mechanism will cease to operate. Consequently, should the cotton harvester become clogged or should a foreign object be passed into the casings, the moistener mechanisms will automatically yield and will automatically shut off the harvester from further operation.

Other objects and advantages of the invention will become apparent to those skilled in the art as the nature of the invention is better understood from the following description and as shown in the accompanying drawings.

FIG. 1 is a plan view of a cotton harvester with portions broken away for purposes of clairity and with portions within the harvester shown in representative form.

FIG. 2 is the side view of the upper portion of the harvester with portions removed to show internal mechanism.

FIG. 3 is an enlarged sectional view taken substantially along the line 3—3 of FIG. 1.

The cotton harvester includes an upright housing of a conventional nature which is composed of a pair of upright casings 10, 11 disposed on opposite sides of a row of cotton plants and spaced apart to define a plant passage which successively receives the plants as the harvester advances over the field.

The casings 10, 11 have open inner sides as indicated by the grid bars 13 on the right side of the plant passage (FIG. 1) which are vertically spaced apart so as to permit passage of picking spindles or elements 14 into the plant passage for the purpose of picking or harvesting the ripe cotton bolls from the plant. Although not shown, a similar arrangement of grid bars is provided for the left casing 11 through which picking spindles or elements 15 may pass.

Vertically disposed picking or harvesting drums, here indicated in their entirety by the reference numerals 20, 21, are contained within the casings 10, 11, respectively, and carry the aforementioned picking elements or spindles 14, 15. Generally the picking drums 20, 21 operate so as to move in an orbit in which the picking elements move through the plant passage 12 from front to rear and then inwardly into their respective casings 10, 11. Further provided in casings 10, 11 are a pair of upright doffing mechanisms 22, 23 which engage the spindles 14, 15 of the picking drums 20, 21 and operate to dislodge the cotton bolls from the spindles. Conventionally, the cotton bolls are discharged forwardly by the doffing mechanisms 22, 23 to a point adjacent the inlet end of a suction type conveying means. While the cotton harvester has been described only sufficiently for a full appreciation of the present invention, details of the entire harvester mechanism, if desired, may be had by reference to U.S. Patent 2,904,948 issued to Mr. A. L. Hubbard, September 22, 1959.

As the picking spindles 14, 15 continue in their orbital movement and after contact with their respective doffing mechanisms 22, 23, they will pass adjacent to moistener mechanisms, here indicated in their entirety be the reference numerals 25, 26, respectively. The moistener mechanisms 25, 26 are mounted on upright supporting shafts 27, 28 which are journaled at 29, 30 at their upper ends to an upper laterally disposed wall 31, which overlies both casings 10, 11, so that the shafts 27, 28 may swivel about their upright axes. The shafts 27, 28 extend through the wall 31 and have connections at their upper terminal ends to receive hoses 32, 33 which feed fluid into the shafts 27, 28. Laterally extending moistener arms 34, 35 are mounted on the shafts 27, 28 by integral hub portions 36, 37 which fit over the respective shafts 27, 28. The arms 34, 35 have moistener pads at their outer end which contact from above the spindles 13, 14 as they move in their orbits adjacent the arms 34, 35. The shafts 27, 28 are provided with radial hoses, not shown, inwardly of the hubs 36, 37 so that fluid passed through the hoses 32, 33 may move through fluid passages in arms 34, 35 and into the pads at their ends. The exact nature or structure of the moistener mechanism as well as the method of feeding fluid into the moistener mechanism is unimportant for the purposes of the present invention. Consequently, the moistener mechanism of the present invention is more or less shown in representative form. However, the shafts 27, 28 and of the respective hubs 36, 37 may be considered as defining columnar supports for the moistener arms 34, 35.

Reviewing FIG. 2, it becomes apparent that the arms 34, 35 extend laterally to a position of close proximity to the respective spindles, 14, 15 and are also disposed to lie between the vertically spaced rows of those spindles. Consequently, the moistener mechanisms and particularly the arms 34, 35 operate as walls having slots or openings through which the spindles 14, 15 may pass. In this respect, it should be recognized that any type of upright wall structure which would be swivelly mounted about an upright axis and which have arms extending between the vertically spaced rows of picking spindles would operate for purposes of the present invention. However, since the moistener mechanisms are conventional in most types of pickers it has been determined that the modification of swively mounting the moistener mechanism within the casings is the most convenient manner of providing a wall structure which will swivel within the casings.

Fixed to the upper ends of the shaft 27, 28 and above the laterally disposed wall 31 and beneath a second overhead wall 42 are a pair of arms 40, 41 which will rock in response to swivelling of the respective shafts 27, 28. As later will become apparent the arms 40, 41 will operate in response to swivelling of the moistener mechanisms 25, 26 to automatically shut off the drive for the harvester.

Referring now to the main drive means for the cotton harvester, there is provided a main drive shaft 50, driven by the main power source of the harvester which is connected to a rearwardly projecting splined shaft 51 extending into a bevel gear transmission, not shown, but contained in a transmission housing 53. Power is transferred to the picking drums from the beveled gear transmission and serves to operate all harvesting and doffing mechanisms in the picking unit. The drive shaft 50 and the splined end 51 are connected by means of a universal type joint 54 composed of the first part 55 connected to the drive shaft 50 and a second part 56 rotatably mounted on an extension of the spline shaft 51. A suitable overrunning clutch 58 is also provided between the drive shaft 50 and the universal joint part 55.

Integral with the universal joint part 56 is one face 60 of a jaw clutch. Carried on the splined shaft 51 is a second face 62 of the jaw clutch having an outer and annular slot or groove 63. A control lever 65 is provided for the clutch part 62 and includes a bifurcated end with parts thereof overlying and underlying respectively the annular slot 63. Pins 66 extend from the bifurcated end of the lever 65 into the annular slot 63 in the clutch face 62. The lever 65 is pivotally mounted on a vertical pivot 67 which in turn is carried by a bracket 68 integrally cast with the transmission housing 53. Obviously, therefore, the lever 65 is permitted lateral movement on the pivot pin 67 and is capable of moving the clutch face 62 into or out of engagement with the driving clutch face 60. When the clutch is engaged, the shaft 51 is driven and in turn drives the harvesting mechanism within the cotton picker.

The lever 65 is normally held in position to engage the clutch by means of the releasable type lock at its outer end. The lock is composed of a circular supporting plate 69 which is fixed to the overhead wall 42 of the picker housing. The supporting plate 69 has integral upright extending brackets 70, 71. The bracket 70 carries an eye-bolt 72 which is connected to a forwardly extending spring 73 connected at its forward end to the lever 65. The spring 73 operates as biasing means urging the lever 65 to disengage the clutch jaws 60, 62. A bell crank 75 is pivoted at 76 to the forward bracket 71 to swing vertically. One leg of the bell crank 75 is notched at 77 to receive the lever 65 and to generally lock it against the action of the spring 73 for the purpose of maintaining lever 65 and its associated clutch 60, 62 in the drive position. The bell crank 75 also has a leg extending upwardly from the pivot 76 which is connected at its upper end to a forwardly extending connecting rod 78. In operation, as the connecting rod 78 is drawn forwardly, it will tip the bell crank 75 so that the notch 77 clears the lever 65 and thereby releases the lever 65 to disengage the clutch jaws 60, 62. This will, therefore, demobilize the entire drive to the harvesting mechanism.

The rod 78 is controlled at its forward end by means of an arm 79 which is bolted at 80 to a vertically disposed shaft 81 extending between and journaled at 82, 83 to the overhead wall 42, and the laterally disposed wall 31 respectively. Adjacent the lower end of the shaft 81 and fixed thereto are a pair of radial arms 84, 85. A connecting rod 86 extends from the outer end of the arm 41 to the outer end of the radial arm 84. The rod 86 is connected to the arm 84 by means of a tubular mount 87, through which the rod 86 extends, which is swivelled at 88 to the arm 84. A stop nut 89 is provided on the end of the rod 86 which will engage the end of the tubular mount 87. Consequently, the rod 86 is free to move axially in the tubular mount in one direction but is restricted by the nut 89 in movement in the opposite direction.

Extending across the forward end of the harvester and between the casings 10 and 11 is a laterally disposed connecting rod 90 connecting the outer end of the arm 40 to the outer end of the arm 85. The rod 90 is also provided with a tubular mount 91 and a stop nut 92 which permits the rod 90 to move in one direction relative to the arm 85 but restricts movement in the opposite direction.

Viewing the linkages extending from the moistener mechanism 25 and from the moistener mechanism 26, it becomes apparent that should the moistener mechanism 25 be swivelled in a clockwise direction, the rod 90 will rock the shaft 81 in a clockwise direction. This would have no effect upon the moistener mechanism 26 since the tubular mount 87 would merely ride along the connecting rod 86. Similarly, should the moistener mechanism 26 be swivelled in a counter clockwise direction, the rod 86 would rock the upright shaft 81 in a clockwise direction. However, such movement by the shaft rod 86 would not effect the moistener mechanism 25 since the tubular mount 91 would merely slip along the rod 90. Regardless of which moistener mechanism 25, 26 is swivelled, therefore, the upright shaft 81 moves in a clockwise direction. Clockwise movement of the shaft 81 will force the connecting rod 78 to be drawn forwardly which will in effect release the lever 65 and disengage the clutch jaws 60, 62.

Detent means or other lock means are provided to prevent swivelling of the moistener mechanisms 25, 26 except for abnormally large loads being applied on the arms 34, 35. The detent means are comprised of detent assemblies 95, 96 which engage the edges of arms 40, 41 respectively. The detent assemblies 95, 96 are carried on L-shaped brackets 97, 98, the lower horizontally disposed legs of which are welded to the panel 31. Each bracket 97, 98 has vertical leg portions disposed forwardly of the arms 40, 41 and carry the detents 95, 96.

Referring now to FIG. 3 to show details of the detent assembly 96, the assembly 96 is composed of a detent rod 103 extending through the vertical leg portion of the L-shaped bracket 98. An adjustable nut 99 is mounted on the rod 103 and may be adjusted for purposes of increasing or decreasing the pressure of the detent. A compression spring 102 is carried on the shank of the rod between the bracket 103 and an enlarged head or end 104 on the detent rod 103. The detent head 104 slips into a recessed slot 105 in the outer edge of the arm 41. The spring 102 operates to bias the head 104 and to maintain the head 104 in the recess 105.

As may become readily apparent, should a slight amount of clogging occur within the casing walls 10, 11, the detents 95, 96 would resist swivelling of the moistener mechanisms 25, 26. However, should a sufficient build-up of cotton or clogging occur within either of the casing walls 10, 11, there would be created a build-up of cotton in front of the respective stack or wall of arms 34, 35. This would create an abnormally large force on the arms 34, or the arms 35, and one or both of the detents 95 or 96 would be released from contact with their respective arms 40, 41, and one or both of the moistener mechanisms 25 or 26 would be permitted to swivel. Should either of the moistener mechanisms swivel, the drive mechanism would immediately be disengaged on demobilized by moving the clutch into a no-drive condition.

While only one form of the invention has been shown, it should be recognized that other forms and variations will occur to those skilled in the art. Therefore, while the present description was shown and described in detail, it was so described and shown for purposes of clearly and concisely illustrating the principles of the invention, and there was no intention to limit or narrow the appended claims beyond the broad concepts therein set forth.

What is claimed is:

1. In a cotton harvester having an upright casing with an open side; harvesting mechanism within the casing including a vertically disposed picking drum with a plurality of vertically spaced laterally extending picking elements adapted to extend outwardly of the open side of the casing and into a plant row for picking cotton from the plants; a cotton doffing mechanism within the casing for removing the cotton from the picking elements; a moistening mechanism within the casing beyond the doffing mechanism including an upright columnar support mounted for pivotal movement in the casing and having laterally extending moistener arms spaced vertically on the order of the picking elements and disposed closely adjacent to and between the picking elements; biased detent means supported in the casing and engaging the columnar support for restricting pivotal movement thereof; drive means for operating the picking drum and doffing mechanism including a clutch movable to adjust the drive means between a drive and no-drive condition; and linkage means extending from the columnar support to the clutch effective to move the clutch to a no-drive condition upon a restriction being disposed adjacent the moistener arms and in the path of the laterally disposed picking elements, said restriction being sufficient to effect pivotal movement of the columnar support.

2. In a cotton harvester having an upright casing with an open side; a vertically disposed picking drum within the casing having a plurality of vertically spaced laterally extending picking elements adapted to extend outwardly of the open side of the casing and into a plant row for picking cotton from the plants; a cotton doffing mechanism within the casing for removing the cotton from the picking elements; an upright moistening mechanism within the casing beyond the doffing mechanism mounted for pivotal movement in the casing and having laterally extending moistener arms spaced vertically on the order of the picking elements and disposed closely adjacent to and between the picking elements; overload lock means supported in the casing restricting pivotal movement of the moistening mechanism; drive means for the harvester including a clutch movable to adjust the drive means between a drive and no-drive condition; and linkage means extending from the moistening mechanism to the clutch effective to move the clutch to a no-drive condition upon a restriction being disposed adjacent the moistener arms and in the path of the laterally disposed picking elements, said restriction being sufficient to effect release of the overload lock means and permit pivotal movement of the moistening mechanism.

3. In a cotton harvester having an upright casing with an open side; a vertically disposed picking drum within the casing having a plurality of vertically spaced laterally extending picking elements adapted to extend outwardly of the open side of the casing and into a plant row for picking cotton from the plants; a cotton doffing mechanism within the casing for removing the cotton from the picking elements; an upright wall structure within the casing beyond the doffing mechanism and having laterally extending arms spaced vertically on the order of the picking elements and extending between the picking elements; means mounting the upright wall structure on the casing for lateral movement; overload lock means supported in the casing restricting lateral movement of the upright wall structure; drive means for the harvester including a clutch movable to adjust the drive means between a drive and no-drive condition; and clutch operating means connected to the clutch responsive to lateral movement of the wall structure to move the clutch to a no-drive condition, said lateral movement occurring upon a restriction being disposed adjacent the arms and in the path of the laterally disposed picking elements sufficient to release the overload lock means.

4. In a cotton harvester having an upright casing with an open side; a vertically disposed picking drum within the casing having a plurality of vertically spaced laterally extending picking elements adapted to extend outwardly of the open side of the casing and into a plant row for picking cotton from the plants; an upright wall structure within the casing having laterally extending arms spaced vertically on the order of the picking elements and extending between the picking elements; means mounting the upright wall structure on the casing for lateral movement; overload lock means supported in the casing restricting lateral movement of the upright wall structure; drive means for the harvester including a clutch movable to adjust the drive means between a drive and no-drive condition; and clutch operating means connected to the clutch responsive to lateral movement of the wall structure to move the clutch to a no-drive condition, said lateral movement occurring upon a restriction being disposed adjacent the arms and in the path of the laterally disposed picking elements sufficient to release the overload lock means.

5. In a cotton harvester having a pair of upright casings normally disposed on opposite sides of a row of plants with open sides thereof facing the plants; harvesting mechanisms within the casings including vertically disposed picking drums with vertically spaced laterally extending picking elements adapted to extend outwardly of the open sides of the respective casings and into the plant row for picking cotton from the plants; cotton moistening mechanisms within the casing, each having an upright columnar support mounted for pivotal movement in the casing and having laterally extending moistener arms spaced vertically on the order of the picking elements and extending closely adjacent to and between the picking elements; biased detent means supported in the casings and engaging the columnar supports for restricting pivotal movement thereof; drive means for operating the harvester including a clutch movable to adjust the drive means between a drive and no-drive condition; and linkage means extending from each columnar support to the clutch effective to move the clutch to a no-drive condition upon a restriction being disposed adjacent the moistener arms and in the path of the laterally disposed picking elements sufficient to overcome the detent means.

6. The invention defined in claim 5 in which the linkage extending from the clutch to the columnar supports is a series type linkage with a portion of the linkage extending from one of the columnar supports to the other and a further portion extending from thence to the clutch, and said linkage portions being connected to the respective columnar supports by means whereby pivotal movement of either columnar support will operate to effect movement of the clutch to a no-drive condition.

7. In a cotton harvester having a pair of upright casings normally disposed on opposite sides of a row of plants with open sides thereof facing the plants; harvesting mechanisms within the casings including vertically disposed picking drums with vertically spaced laterally extending picking elements adapted to extend outwardly of the open sides of the respective casings and into the plant row for picking cotton from the plants; cotton doffing mechanisms within the casing for removing the cotton from the picking elements; upright wall structure within the casings beyond the respective doffing mechanisms, each having an upright support mounted for lateral movement in the casing and having laterally extending arms extending between the picking elements; overload lock means supported in the casings engaging the wall structures for restricting lateral movement thereof; drive means for operating the harvester including a clutch effecting a drive and no-drive condition; and connecting means extending from each wall structure to the clutch effective to move the clutch to a no-drive condition upon a restriction being disposed adjacent the arms and in the path of the laterally disposed picking elements sufficient to overcome the overload lock means.

8. A moistener assembly for a cotton harvester having a casing, harvesting mechanism mounted in the casing, and drive mechanism including a clutch operating the harvesting mechanism, said moistener assembly comprising: an upright support; means mounting the support on the casing for swivelling about an upright axis; a plurality of vertically spaced radial moistener arms extending from the support in close proximity to the harvesting mechanism; detent means supported on the casing and in engagement with the upright support for preventing swivelling of the upright support upon normal load on the arms; and means extending from the upright support for connection to the clutch effective to throw-out the clutch in response to swivelling of the upright support.

9. A moistener assembly for a cotton harvester having a casing, harvesting mechanism mounted in the casing, and drive mechanism including a clutch operating the harvesting mechanism, said moistener assembly comprising: an upright support; means mounting the support on the casing for swivelling about an upright axis; a plurality of vertically spaced radial moistener arms extending from the support in close proximity to the harvesting mechanism; yieldable means mounted on the casing operatively associated with the upright support for preventing swivelling of the upright support upon normal load on the arms but yieldable to permit swivelling upon abnormally large loads on the arms; and means extending from the upright support for connection to the clutch effective to throw-out the clutch in response to swivelling of the upright support.

10. A safety mechanism for a cotton harvester having a casing, harvesting mechanism mounted in the casing, and drive mechanism including a clutch operating the harvesting mechanism, said safety mechanism comprising: an upright wall structure; means mounting the structure on the casing for lateral movement; a plurality of laterally extending arms on the wall structure extending in close proximity to the harvesting mechanism; yieldable means mounted on the casing operatively associated with the upright wall structure for preventing lateral movement of the upright structure upon normal load on the structure but yieldable to permit movement upon abnormally large loads on the structure; and means extending from the upright structure for connection to the clutch effective to throw-out the clutch in response to movement of the upright structure.

11. In a cotton harvester having an upright casing with an open side; a vertically disposed picking drum within the casing having a plurality of vertically spaced laterally extending picking elements adapted to extend outwardly of the open side of the casing and into a plant row for picking cotton from the plants; an upright wall structure within the casing having laterally extending arms spaced vertically on the order of the picking elements and extending between the picking elements; means mounting the upright wall structure on the casing for movement; overload lock means supported in the casing restricting movement of the upright wall structure; mobilizable and demobilizable drive means for the harvester; and means responsive to movement of the wall structure to demobilize the drive means, said movement occurring upon a restriction being disposed adjacent the arms and in the path of the laterally disposed picking elements sufficient to release the overload lock means.

12. A safety mechanism for a cotton harvester having a casing, harvesting mechanism mounted in the casing, and selectively mobilizable or demobilizable drive mechanism operating the harvesting mechanism, said safety mechanism comprising: an upright structure; means mounting the structure in the casing for movement and in close proximity to the harvesting mechanism; a plurality of laterally extending arms on the wall structure extending in close proximity to the harvesting mechanism; yieldable means mounted on the casing operatively associated with the upright wall structure for preventing movement of the upright structure but yieldable to permit movement upon abnormally large loads on the structure; and means extending from the upright structure for connection to the drive means effective to demobilize the latter in response to movement of the upright structure.

References Cited in the file of this patent

UNITED STATES PATENTS

| | | |
|---|---|---|
| 1,174,387 | Calderwood | Mar. 7, 1916 |
| 2,458,531 | Rust | Jan. 31, 1949 |
| 2,533,630 | Rust | Dec. 12, 1950 |
| 2,754,651 | Fergason | July 17, 1956 |
| 2,845,767 | Crawford | Aug. 6, 1958 |